US012212948B2

(12) United States Patent
Audfray et al.

(10) Patent No.: US 12,212,948 B2
(45) **Date of Patent: *Jan. 28, 2025**

(54) METHODS AND SYSTEMS FOR AUDIO SIGNAL FILTERING

(71) Applicant: Magic Leap, Inc., Plantation, FL (US)

(72) Inventors: Remi Samuel Audfray, San Francisco, CA (US); Jean-Marc Jot, Aptos, CA (US); Samuel Charles Dicker, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,585

(22) Filed: Aug. 24, 2023

(65) Prior Publication Data

US 2023/0412999 A1 Dec. 21, 2023

Related U.S. Application Data

(63) Continuation of application No. 17/897,036, filed on Aug. 26, 2022, which is a continuation of application (Continued)

(51) Int. Cl.

*H04S 1/00* (2006.01)
*H04R 5/033* (2006.01)
*H04S 7/00* (2006.01)

(52) U.S. Cl.

CPC .............. *H04S 1/007* (2013.01); *H04S 1/005* (2013.01); *H04S 7/304* (2013.01); *H04R 5/033* (2013.01);

(Continued)

(58) Field of Classification Search

CPC .......... H04S 1/007; H04S 1/005; H04S 7/304; H04S 2400/11; H04S 2420/01;

(Continued)

(56) References Cited

U.S. PATENT DOCUMENTS 4,852,988 A 8/1989 Velez
6,433,760 B1 8/2002 Vaissie (Continued)

FOREIGN PATENT DOCUMENTS

CA 2316473 A1 1/2001
CA 2362895 A1 12/2002

(Continued)

OTHER PUBLICATIONS

Grijalva et al. (2014). "Anthropometric-based customization of head-related transfer functions using Isomap in the horizontal plane", 2014 IEEE, International Conference on Acoustic, Speech and Signal Processing (ICASSP). Retrieved on Aug. 17, 2019. Retrieved from: URL:http://www.ic.unicamp.br/siome/papers/GriJalva-ICASP-2014.pdf, entire document.

(Continued)

*Primary Examiner* — Yosef K Laekemariam
(74) *Attorney, Agent, or Firm* — Morrison & Foerster LLP

(57) ABSTRACT

Systems and methods for rendering audio signals are disclosed. In some embodiments, a method may receive an input signal including a first portion and the second portion. A first processing stage comprising a first filter is applied to the first portion to generate a first filtered signal. A second processing stage comprising a second filter is applied to the first portion to generate a second filtered signal. A third processing stage comprising a third filter is applied to the second portion to generate a third filtered signal. A fourth processing stage comprising a fourth filter is applied to the second portion to generate a fourth filtered signal. A first output signal is determined based on a sum of the first filtered signal and the third filtered signal. A second output signal is determined based on a sum of the second filtered signal and the fourth filtered signal. The first output signal is (Continued)

presented to a first ear of a user of a virtual environment, and the second output signal is presented to the second ear of the user. The first portion of the input signal corresponds to a first location in the virtual environment, and the second portion of the input signal corresponds to a second location in the virtual environment.

20 Claims, 13 Drawing Sheets

Related U.S. Application Data

No. 16/987,079, filed on Aug. 6, 2020, now Pat. No. 11,477,592, which is a continuation of application No. 16/789,201, filed on Feb. 12, 2020, now Pat. No. 10,779,103, which is a continuation of application No. 16/442,258, filed on Jun. 14, 2019, now Pat. No. 10,602,292.

(60) Provisional application No. 62/685,258, filed on Jun. 14, 2018.

(52) U.S. Cl.
CPC ....... *H04S 2400/11* (2013.01); *H04S 2420/01* (2013.01)

(58) Field of Classification Search
CPC .......... H04S 2420/07; H04S 1/00; H04S 7/00; H04R 5/033
USPC .................................... 381/17, 18, 111, 150
See application file for complete search history.

(56) References Cited

U.S. PATENT DOCUMENTS

| | | | |
|---|---|---|---|
| 6,491,391 | B1 | 12/2002 | Blum et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,347,551 | B2 | 3/2008 | Fergason et al. |
| 7,488,294 | B2 | 2/2009 | Torch |
| 8,235,529 | B1 | 8/2012 | Raffle |
| 8,428,269 | B1 | 4/2013 | Brungart |
| 8,488,819 | B2 | 7/2013 | Pang |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,226,090 | B1 | 12/2015 | Norris |
| 9,274,338 | B2 | 3/2016 | Robbins et al. |
| 9,292,973 | B2 | 3/2016 | Bar-zeev et al. |
| 9,323,325 | B2 | 4/2016 | Perez et al. |
| 9,538,307 | B2 | 1/2017 | Araki |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 10,602,292 | B2 | 3/2020 | Audfray |
| 10,779,103 | B2 | 9/2020 | Audfray et al. |
| 10,979,843 | B2 | 4/2021 | Thagadur Shivappa |
| 11,477,592 | B2 | 10/2022 | Audfray et al. |
| 11,778,400 | B2 | 10/2023 | Audfray et al. |
| 2003/0030597 | A1 | 2/2003 | Geist |
| 2006/0023158 | A1 | 2/2006 | Howell et al. |
| 2006/0115090 | A1* | 6/2006 | Kirkeby .................. H04S 1/002 381/103 |
| 2007/0019812 | A1* | 1/2007 | Kim .......................... H04S 1/00 381/17 |
| 2007/0172086 | A1 | 7/2007 | Dickins |
| 2008/0056503 | A1 | 3/2008 | Mcgrath |
| 2009/0214045 | A1 | 8/2009 | Fukui |
| 2010/0303246 | A1 | 12/2010 | Walsh |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2012/0215519 | A1 | 8/2012 | Park |
| 2013/0077147 | A1 | 3/2013 | Efimov |
| 2014/0195918 | A1 | 7/2014 | Friedlander |
| 2015/0168731 | A1 | 6/2015 | Robbins |
| 2016/0026253 | A1* | 1/2016 | Bradski ................ H04N 13/128 345/8 |
| 2016/0373877 | A1 | 12/2016 | Laitinen |
| 2017/0094440 | A1 | 3/2017 | Brown |
| 2017/0245082 | A1 | 8/2017 | Boland |
| 2019/0116448 | A1 | 4/2019 | Schmidt |
| 2022/0417686 | A1 | 12/2022 | Audfray et al. |

FOREIGN PATENT DOCUMENTS

| | | | |
|---|---|---|---|
| CA | 2388766 | A1 | 12/2003 |
| WO | 2014090277 | A1 | 6/2014 |
| WO | 2019241760 | A1 | 12/2019 |

OTHER PUBLICATIONS

International Preliminary Report dated Dec. 15, 2020, for PCT Application No. PCT/US2019/037390, filed Jun. 14, 2019, seven pages.
International Search Report mailed Sep. 3, 2019, for PCT Application No. PCT/US2019/037390, filed Jun. 14, 2019, three pages.
Jacob, R. "Eye Tracking in Advanced Interface Design", Virtual Environments and Advanced Interface Design, Oxford University Press, Inc. (Jun. 1995).
Non-Final Office Action mailed Feb. 10, 2023, for U.S. Appl. No. 17/897,036, filed Aug. 26, 2022, nine pages.
Non-Final Office Action mailed Feb. 8, 2022, for U.S. Appl. No. 16/987,079, filed Aug. 6, 2020, eight pages.
Non-Final Office Action mailed Mar. 9, 2020, for U.S. Appl. No. 16/789,201, filed Feb. 12, 2020, eight pages.
Notice of Allowance (corrected) mailed Jan. 16, 2020, for U.S. Appl. No. 16/442,258, filed Jun. 14, 2019, four pages.
Notice of Allowance (corrected) mailed Mar. 6, 2020, for U.S. Appl. No. 16/442,258, filed Jun. 14, 2019, four pages.
Notice of Allowance mailed Jul. 22, 2022, for U.S. Appl. No. 16/987,079, filed Aug. 6, 2020, seven pages.
Notice of Allowance mailed Jul. 24, 2023, for U.S. Appl. No. 17/897,036, filed Aug. 26, 2022, seven pages.
Notice of Allowance malled May 6, 2020, for U.S. Appl. No. 16/789,201, filed Feb. 12, 2020, seven pages.
Notice of Allowance mailed Nov. 12, 2019, for U.S. Appl. No. 16/442,258, filed Jun. 14, 2019, nine pages.
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Carmigniani, J., et al., "Augmented Reality Technologies, Systems and Applications," Multimedia Tools and Applications, 51(1):341-77 (Dec. 2010) ("Augmented Reality Technologies").
Declaration of Dr. Stephen C. Thompson Under 37 C.F.R. § 1.132 including Appendix A (List of Materials Considered) and Appendix B (Curriculum Vitae) and Incorporated Claim Charts CC-1—CC-9.
Gerzon, M., "Stereo shuffling: new approach-old technique," Studio Sound and Broadcast Engineering, pp. 122-130 (Jul. 1986) ("Gerzon").
Mattana, A., "The history of binaural audio, Part 1: The first experiments, 1881-1939" accessed at https://www.linkedin.com/pulse/history-binaural-audio-part-1-anthony-mattana/ (Jul. 2017).
Milgram, P. and Kishino, F., "A Taxonomy of Mixed Reality Visual Displays," IEICE Transactions on Information & Systems, E77-D(12):1321-29 (Dec. 1994) ("Taxonomy of Mixed Reality").

(56) References Cited

OTHER PUBLICATIONS

Prosecution File History of U.S. Pat. No. 10,779,103 ("'103 File History").
Zotkin, D.N., et al., "Rendering Localized Spatial Audio in a Virtual Auditory Space," IEEE Transactions on Multimedia, 6(4): 553-564 (Aug. 2004) ("Zotkin-IEEE").
Request for Ex Parte Reexamination of U.S. Pat. No. 10,779,103 B2 under 35 U.S.C. § 302 and 37 C.F.R. §1.510 with US1-US7, FP1, and NPL1-NPL7.
Prosecution File History of U.S. Pat. No. 10,602,292 ("292 File History).
Request for Ex Parte Reexamination of U.S. Pat. No. 10,602,292 B2 under 35 U.S.C. § 302 and 37 C.F.R. §1.510 with US1-US7, FP1, and NPL1-NPL8. (submitted in 4 parts).
Xie, Bosun, "Head-related Transfer Function and Virtual Auditory Display," J. Ross Publishing, 2013.

* cited by examiner

METHODS AND SYSTEMS FOR AUDIO SIGNAL FILTERING

CROSS-REFERENCE TO RELATED APPLICATION

This application is a continuation of U.S. application Ser. No. 17/897,036, filed Aug. 26, 2022, which is a continuation of U.S. application Ser. No. 16/987,079, filed on Aug. 6, 2020, now U.S. Pat. No. 11,477,592, which is a continuation of U.S. application Ser. No. 16/789,201, filed on Feb. 12, 2020, now U.S. Pat. No. 10,779,103, which is a continuation of U.S. application Ser. No. 16/442,258, filed on Jun. 14, 2019, now U.S. Pat. No. 10,602,292, which claims priority to U.S. Provisional Application No. 62/685,258, filed on Jun. 14, 2018, the contents of which are incorporated by reference herein in their entirety.

FIELD

This disclosure generally relates to digital audio filters, and specifically to aligning and trimming digital audio filters.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of an XR system in such a way that the sounds seem to be occurring—naturally, and consistently with the user's expectations of the sound—in the user's real environment. For example, when presenting a digital sound to a user's two ears via a speaker array (e.g., the left and right speakers of a pair of headphones), it is desirable that the speaker array render the sound in a manner consistent with the user's understanding of the location of that sound's origin in the environment. Further, this should remain true even as the origin of the sound moves throughout the environment. Techniques for filtering digital audio signals in XR environments to render them in such a natural and convincing manner are desired.

BRIEF SUMMARY

Systems and methods for rendering audio signals are disclosed. In some embodiments, a method may receive an input signal including a first portion and the second portion. A first processing stage comprising a first filter is applied to the first portion to generate a first filtered signal. A second processing stage comprising a second filter is applied to the first portion to generate a second filtered signal. A third processing stage comprising a third filter is applied to the second portion to generate a third filtered signal. A fourth processing stage comprising a fourth filter is applied to the second portion to generate a fourth filtered signal. A first output signal is determined based on a sum of the first filtered signal and the third filtered signal. A second output signal is determined based on a sum of the second filtered signal and the fourth filtered signal. The first output signal is presented to a first ear of a user of a virtual environment, and the second output signal is presented to the second ear of the user. The first portion of the input signal corresponds to a first location in the virtual environment, and the second portion of the input signal corresponds to a second location in the virtual environment.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
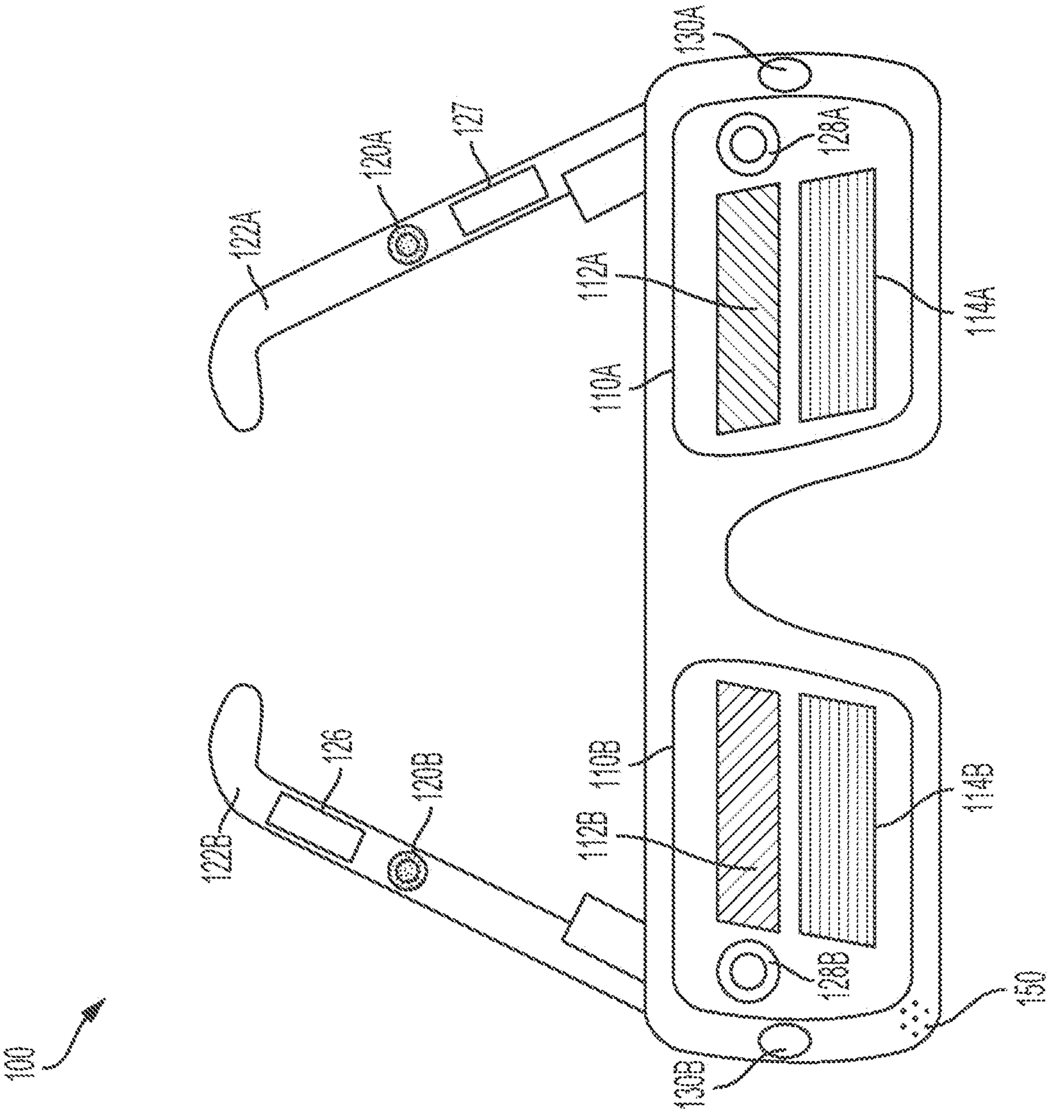
FIG. 1 illustrates an example wearable system, according to some embodiments.

FIG. 1 illustrates an example wearable head device 100 configured to be worn on the head of a user. Wearable head device 100 may be part of a broader wearable system that comprises one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMU) (e.g. IMU 126), acoustic sensors (e.g., microphone 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements)(e.g., eye cameras 128 and 128B). However, wearable head device 100 can incorporate any suitable display technology, and any suitable number, type, or combination of sensors or other components without departing from the scope of the invention. In some examples, wearable head device 100 may incorporate one or more microphones 150 configured to detect audio signals generated by the user's voice; such microphones may be positioned in a wearable head device adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
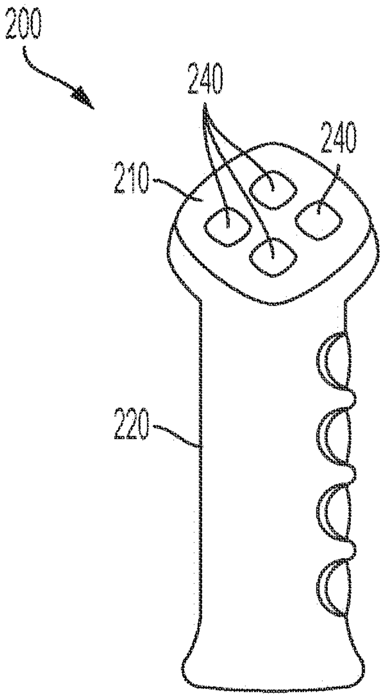
FIG. 2 illustrates an example handheld controller that can be used in conjunction with an example wearable system, according to some embodiments.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200 which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
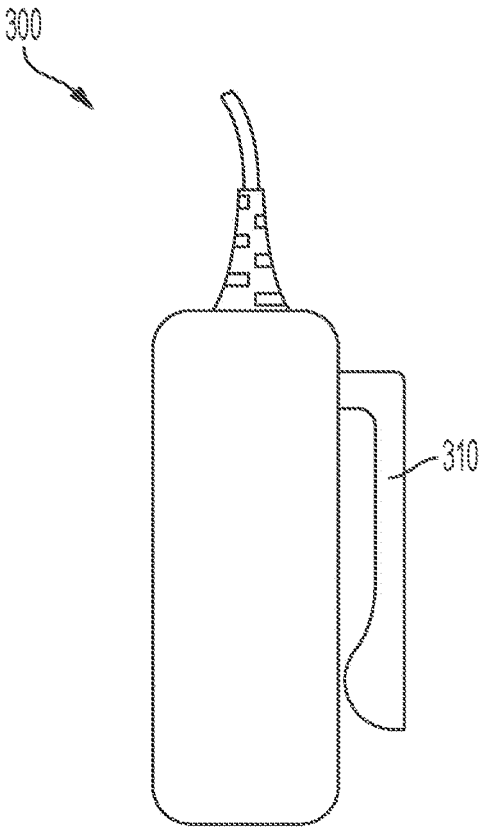
FIG. 3 illustrates an example auxiliary unit that can be used in conjunction with an example wearable system, according to some embodiments.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well-suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
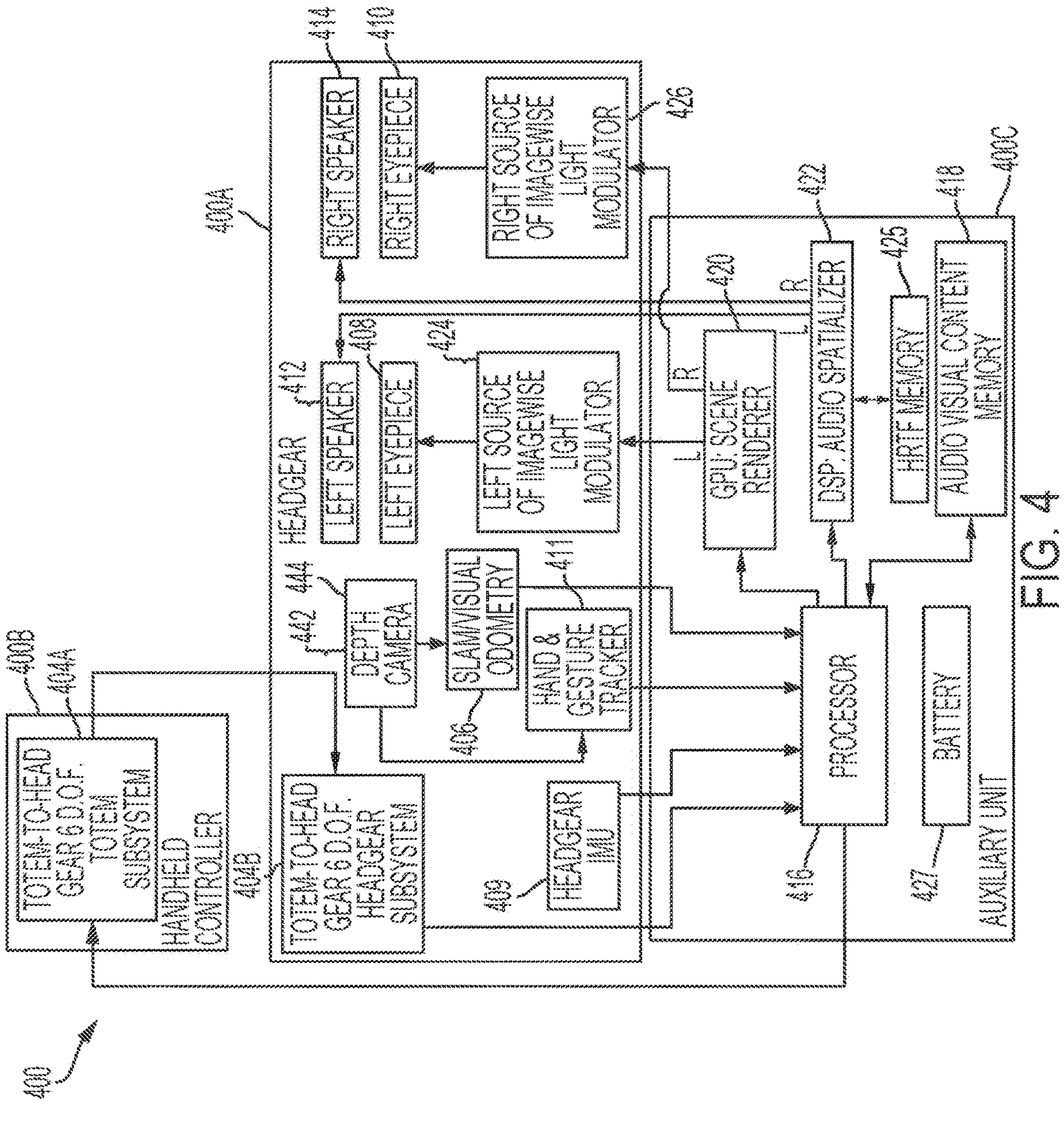
FIG. 4 illustrates an example functional block diagram for an example wearable system, according to some embodiments.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6DOF) totem subsystem 404A. Wearable system 400 can also include example wearable head device 400A (which may correspond to wearable headgear device 100 described above); the wearable head device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations; as vectors; as a rotation matrix; as a quaternion; or as some other representation. In some examples, one or more depth cameras 444 (and/or one or more non-depth cameras) included in the wearable head device 400A; and/or one or more optical targets (e.g., buttons 240 of handheld controller 200 as described above, or dedicated optical targets included in the handheld controller) can be used for 6DOF tracking. In some examples, the handheld controller 400B can include a camera, as described above; and the headgear 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the wearable head device 400A may be determined. In some examples, 6DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to wearable head device 400A) to an inertial coordinate space, or to an environmental coordinate space. For instance, such transformations may be necessary for a display of wearable head device 400A to present a virtual object at an expected position and orientation relative to the real environment (e.g., a virtual person sitting in a real chair, facing forward, regardless of the position and orientation of wearable head device 400A), rather than at a fixed position and orientation on the display (e.g., at the same position in the display of wearable head device 400A). This can maintain an illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the wearable head device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of wearable head device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of wearable head device 400A. The hand gesture tracker 411 can identify a user's hand gestures, for example, by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, a microphone (not shown); and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 416 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to wearable head device 400A and/or handheld controller 400B. Including such components in an auxiliary unit, which can be mounted to a user's waist, can limit the size and weight of wearable head device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with wearable head device 400A or handheld controller 400B. Furthermore, some wearable systems may forgo entirely a handheld controller 400B or auxiliary unit 400C. Such changes and modifications are to be understood as being included within the scope of the disclosed examples.

Mixed Reality Environment

Like all people, a user of a mixed reality system exists in a real environment that is, a three-dimensional portion of the "real world," and all of its contents, that are perceptible by the user. For example, a user perceives a real environment using one's ordinary human senses sight, sound, touch, taste, smell and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example, in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time, based on data associated with the virtual environment and/or input provided by a user, a state of the virtual environment at a second time. For instance, if an object in the virtual environment is located at a first coordinate at time, and has certain programmed physical parameters (e.g., mass, coefficient of friction); and an input received from user indicates that a force should be applied to the object in a direction vector; the processor can apply laws of kinematics to determine a location of the object at time using basic mechanics. The processor can use any suitable information known about the virtual environment, and/or any suitable input, to determine a state of the virtual environment at a time. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate for instance, an audio signal corresponding to a composite of sounds in the virtual environment, and mixed and processed to simulate an audio signal that would be heard by a listener at the listener coordinate and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

Filtering Audio Signals

Systems and methods for filtering audio signals for rendering in a binaural environment (e.g., left and right speakers presenting audio to left and right ears, respectively, in an XR environment) are disclosed. According to embodiments, two input audio signals (or channels) are presented to a filter network, which generates two output audio signals (e.g., left and right signals) for presentation to a user in the binaural environment. The two input signals may correspond to first and second audio sources, such as microphones in a coincident-pair microphone recording, or first and second audio assets originating from first and second locations, respectively, in an XR environment. In some embodiments, a mid-side (M-S) matrix (also known as a stereo shuffler) can be a useful tool for filtering and presenting audio signals as described above. A "mid" component may be considered to be equivalent to a sum of a two-channel input signal, and a "side" component may be considered to be equivalent to a difference of the two-channel input signal.

Figure 5:
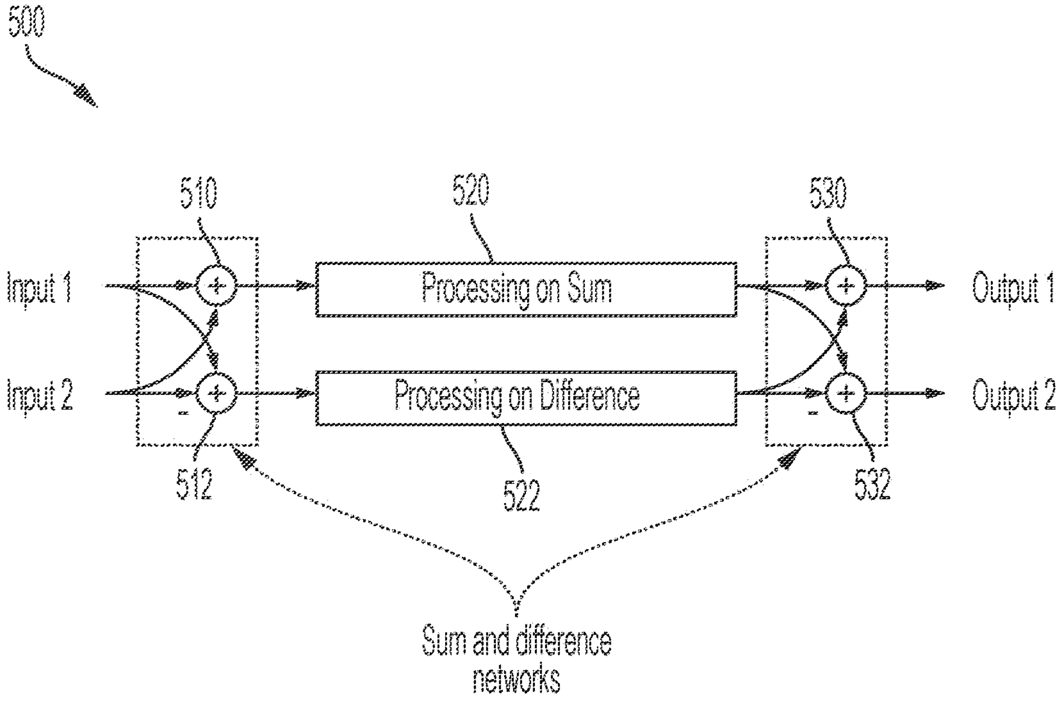
FIG. 5 illustrates an implementation of a signal processing system using mid-side matrices, according to some embodiments.

FIG. 5 illustrates an implementation of a signal processing system 500 using M-S matrices, according to some embodiments. The M-S matrices may be implemented by calculating a sum and a difference of a two channel input signal (e.g., a first input signal (input 1) and a second input signal (input 2)), applying filtering to one or both of the channels (e.g., processing on sum or processing on difference), and calculating a sum and a difference of the filtered (e.g., processed) signals.

In the example shown in FIG. 5, input 1 and input 2 are summed at stage 510, with the sum processed at stage 520; and input 1 and the inverse of input 2 are summed at stage 512 to generate a difference between input 1 and input 2, with the difference processed at stage 522. At stage 530, the output of stage 520 and the output of stage 522 are summed to generate output 1, which may be presented to a first speaker (e.g., a left speaker directed at a user's left ear). At stage 532, the output of stage 520 and the inverse of the output of stage 522 are summed to generate output 2, which may be presented to a second speaker (e.g., a right speaker directed at a user's right ear). Stages 510, 512, 530, and 532 can be referred to as sum and difference networks.

Figure 6:
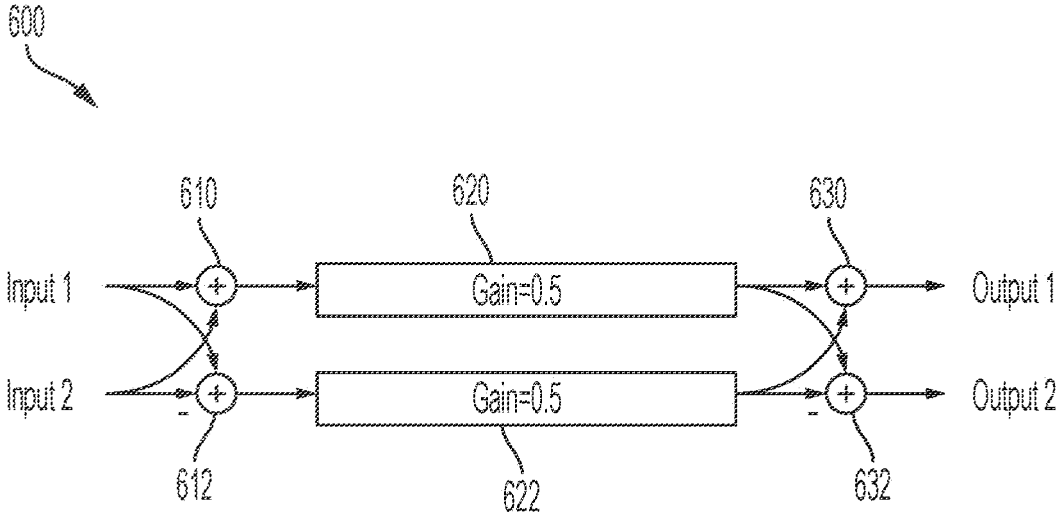
FIG. 6 illustrates an implementation of a signal processing system using mid-side matrices, according to some embodiments.

FIG. 6 illustrates an implementation of a signal processing system 600 using M-S matrices, according to some embodiments. The M-S matrices may be implemented by calculating a sum and a difference of a two channel input signal (e.g., a first input signal (input 1) and a second input signal (input 2)), applying a gain to one or both of the intermediate channels (e.g., gain of 0.5), and calculating a sum and a difference of the gain-adjusted signals. Constraining the sum and difference to a gain of 0.5 may result in a unity system in which original signals (e.g., the first input signal and the second input signal) may be retained.

In the example shown in FIG. 6, input 1 and input 2 are summed at stage 610, with a gain factor of 0.5 applied to the sum at stage 620 (which can correspond to the processing stage 520 in FIG. 5); and input 1 and the inverse of input 2 are summed at stage 612 to generate a difference between input 1 and input 2, with a gain factor of 0.5 applied to the difference at stage 622 (which can correspond to the processing stage 522 in FIG. 5). At stage 630, the output of stage 620 and the output of stage 622 are summed to generate output 1, which may be presented to a first speaker (e.g., a left speaker directed at a user's left ear). At stage 632, the output of stage 620 and the inverse of the output of stage 622 are summed to generate output 2, which may be presented to a second speaker (e.g., a right speaker directed at a user's right ear).

Figure 7:
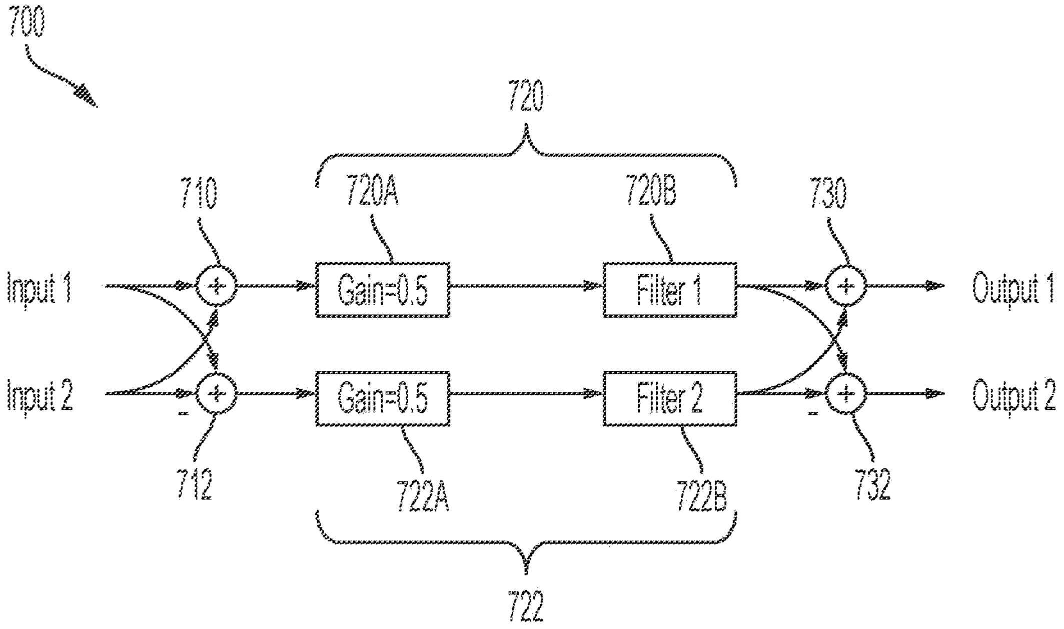
FIG. 7 illustrates an implementation of a signal processing system using mid-side matrices, according to some embodiments.

FIG. 7 illustrates an implementation of a signal processing system 700 using M-S matrices, according to some embodiments. The M-S shuffle may be implemented by calculating a sum and a difference of a two-channel input signal (e.g., a first input signal (input 1) and a second input signal (input 2)), applying a gain to one or both of the intermediate channels (e.g., gain of 0.5), filtering (e.g., via a first filter (filter 1) and a second filter (filter 2)) the gain-adjusted signals, and calculating a sum and a difference of the filtered gain-adjusted signals. As illustrated in FIG. 7, filtering signals (e.g., via the first filter and the second filter) between M-S matrices may be cascaded with a gain of 0.5 for normalization.

In the example shown in FIG. 7, input 1 and input 2 are summed at stage 710, with a gain factor of 0.5 applied to the sum at stage 720A, and a first filter applied at stage 720B to the result. Stages 720A and 720B can together be considered a processing stage 720, which can correspond to the processing stage 520 in FIG. 5. Input 1 and the inverse of input 2 are summed at stage 712 to generate a difference between input 1 and input 2, with a gain factor of 0.5 applied to the difference at stage 722A, and a first filter applied at stage 722B to the result. Stages 722A and 722B can together be considered a processing stage 722, which can correspond to the processing stage 522 in FIG. 5. At stage 730, the output of processing stage 720 and the output of processing stage 722 are summed to generate output 1, which may be presented to a first speaker (e.g., a left speaker directed at a user's left ear). At stage 732, the output of stage 720 and the inverse of the output of stage 722 are summed to generate output 2, which may be presented to a second speaker (e.g., a right speaker directed at a user's right ear).

Figure 8:
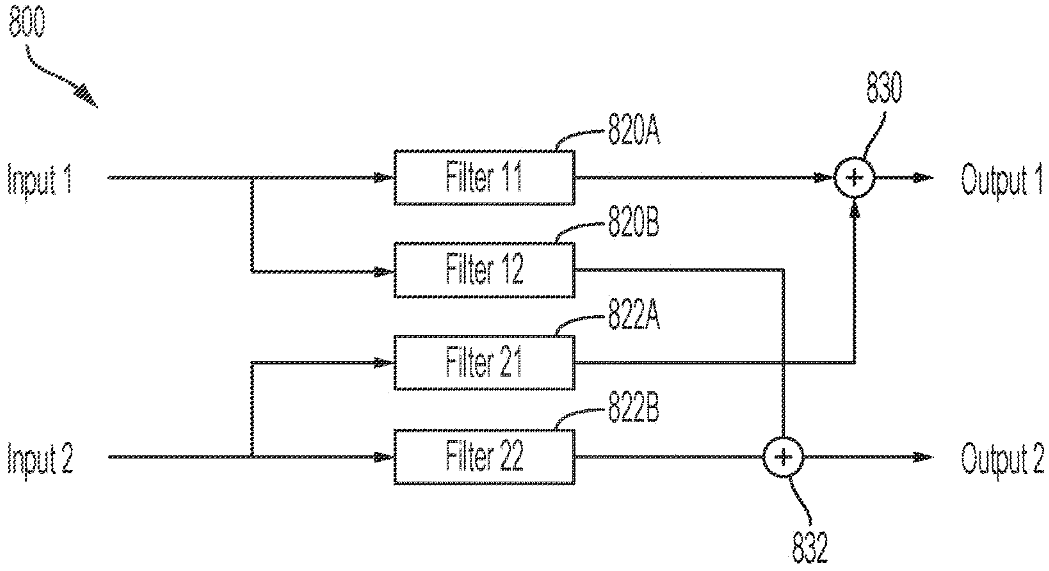
FIG. 8 illustrates a system where two filters are applied to each input signal and summed to generate two output signals, according to some embodiments.

In some embodiments, for example of signal processing, a M-S shuffle approach may be used to apply symmetrical stereo filters to two input signals. FIG. 8 illustrates a system 800 where two filters are applied to each input signal and summed to generate two output signals, according to some embodiments. For example, two filters (e.g., a first filter 820A ("filter 11") and a second filter 820B ("filter 12")) are applied to a first input signal (e.g., input 1) and two filters (e.g., a third filter 822A ("filter 21") and a fourth filter 822B ("filter 22")) are applied to a second input signal (e.g., input 2). The first input signal filtered by the first filter 820A may be referred to as a first filtered signal, the first input signal filtered by the second filter 820B may be referred to as a second filtered signal, the second input signal filtered by the third filter 822A may be referred to as a third filtered signal, and the second input signal filtered by the fourth filter 822B may be referred to as a fourth filtered signal. A first output (e.g., output 1) may be a summation (stage 830) of the first filtered signal and the third filtered signal, and a second output (e.g., output 2) may be a summation (stage 832) of the second filtered signal and the fourth filtered signal.

Figure 9:
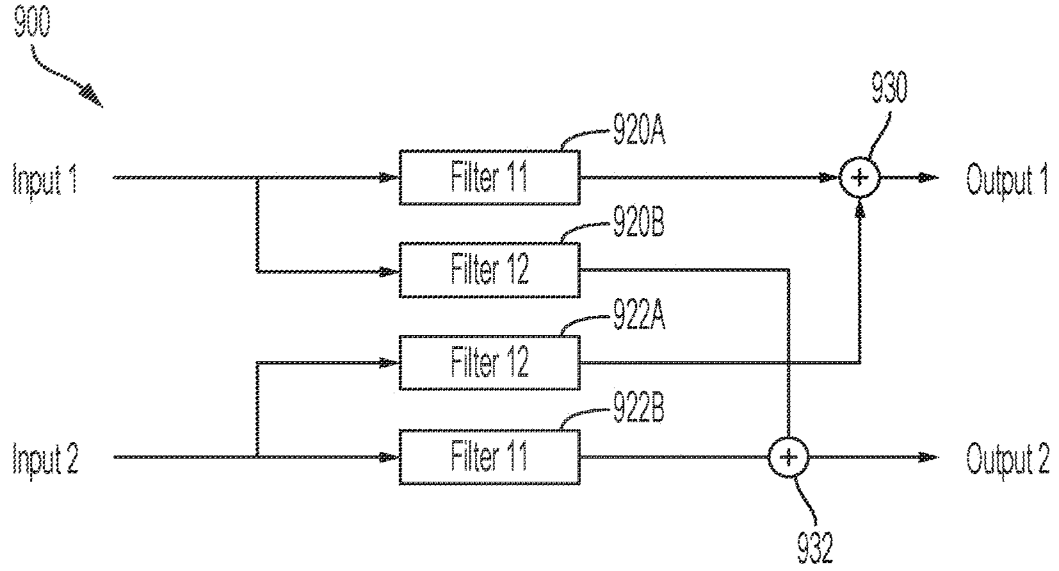
FIG. 9 illustrates a system where two filters are applied to each input signal and summed to generate two output signals, according to some embodiments.

FIG. 9 illustrates an example system 900 where two filters are applied to each input signal and summed to generate two output signals, according to some embodiments. As in the example shown in FIG. 8, two filters (e.g., a first filter 920A ("filter 11") and a second filter 920B ("filter 12")) are applied to a first input signal (e.g., input 1) and two filters (e.g., a third filter 922A ("filter 12") and a fourth filter 922B ("filter 11")) are applied to a second input signal (e.g., input 2). In some embodiments, such as shown in FIG. 9, the first filter 920A and the fourth filter 922B may be identical filters, and the second filter (filter 12) and the third filter (filter 12) may be identical filters. The first input signal filtered by the first filter 920A may be referred to as a first filtered signal, the first input signal filtered by the second filter 920B may be referred to as a second filtered signal, the second input signal filtered by the third filter 922A may be referred to as a third filtered signal, and the second input signal filtered by the fourth filter 922B may be referred to as a fourth filtered signal. A first output (e.g., output 1) may be a summation (stage 930) of the first filtered signal and the third filtered signal, and a second output (e.g., output 2) may be a summation (stage 932) of the second filtered signal and the fourth filtered signal.

As illustrated in the example shown in FIG. 9, symmetrical stereo filters may be applied to the two input signals (e.g., input 1 and input 2). Referring to FIG. 7, a M-S shuffle implementation of a system may be implemented where the first filter 720B of FIG. 7 may be equivalent to a summation of the first filter 920A of FIG. 9 and the second filter 920B of FIG. 9, and the second filter 722B of FIG. 7 may be equivalent to a difference of the first filter 920A of FIG. 9 and the second filter 920B of FIG. 9.

Figure 10:
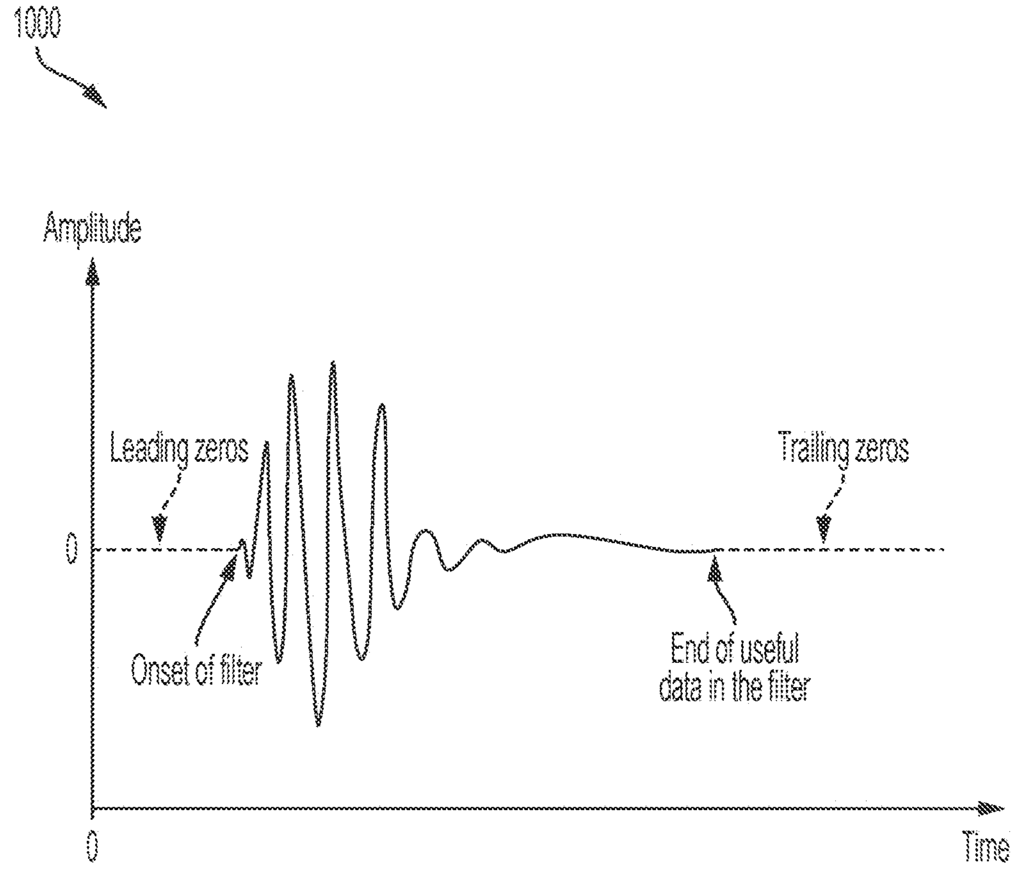
FIG. 10 illustrates a filter impulse response, according to some embodiments.
Figure 11:
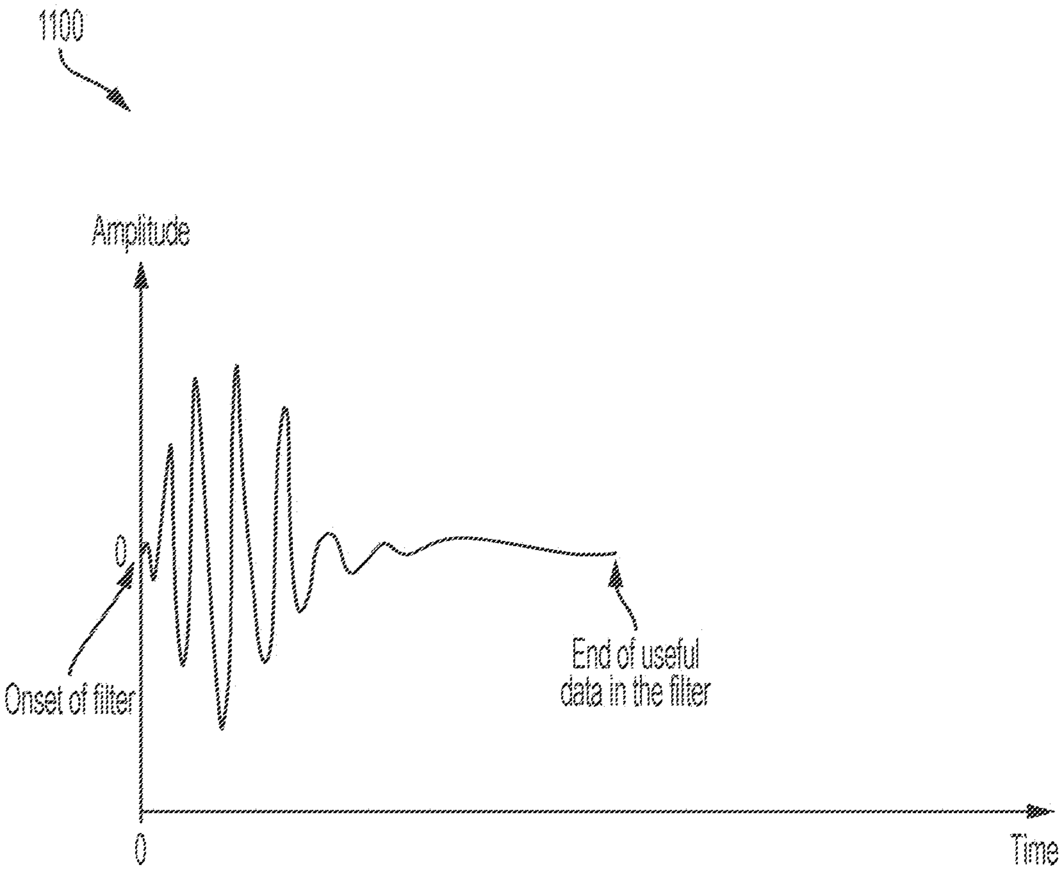
FIG. 11 illustrates a filter impulse response, according to some embodiments.

In some embodiments, digital filters may include leading and trailing zeros or samples with very small values, which may make the filters long. Such filters may require more computing resources (e.g., processor cycles, memory) than shorter filters. FIG. 10 illustrates an example filter impulse response 1000 with leading and trailing zeros, according to some embodiments. FIG. 11 illustrates a filter impulse response 1100 with no leading and trailing zeros, according to some embodiments. Compared to the example filter shown in FIG. 10, the example filter shown in FIG. 11 may be smaller and more computationally efficient.

Figure 12:
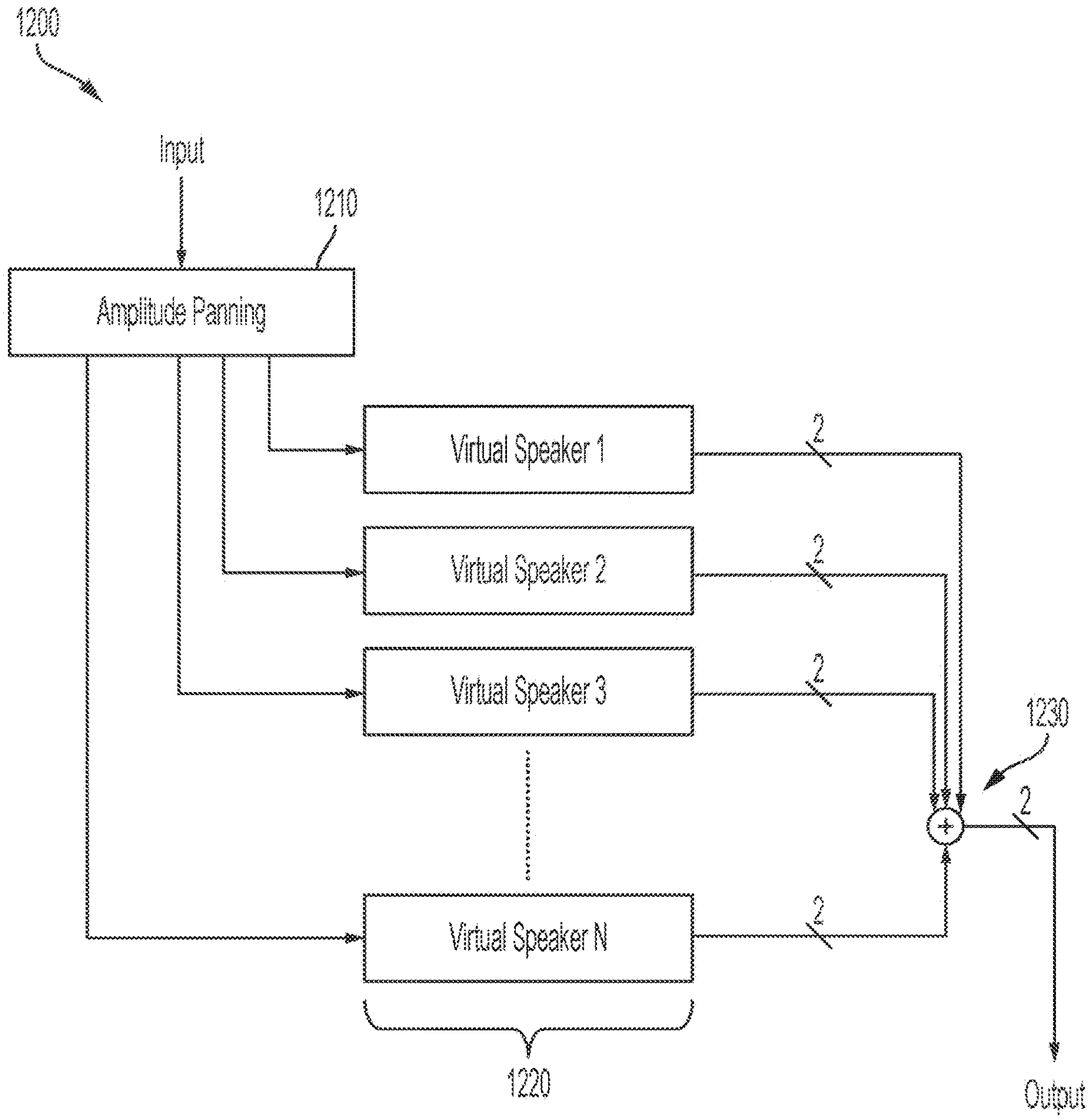
FIG. 12 illustrates an audio rendering system, according to some embodiments.

FIG. 12 illustrates an example audio rendering system 1200, which includes an amplitude panning module 1210 followed by a virtual speaker array (VSA) 1220 made up of N virtual speakers. Each virtual speaker may be realized using, e.g., any one of the systems illustrated in FIGS. 7, 8, and 9, according to some embodiments. The panning module 1210 can accept an audio input signal (e.g., a two-channel audio input such as described above with respect to FIGS. 5-9), and present a processed (e.g., attenuated, amplified, and/or filtered) version of the audio input signal to each of the N virtual speakers. The gain of the signals presented to each of the N virtual speakers can be adjusted to achieve a desired signal balance across the VSA, with the outputs of each virtual speaker summed (stage 1230) and presented as output to a user.

In some embodiments, filters (e.g., filters 920A, 920B, 922A, 922B of FIG. 9) may not be well aligned across sound source positions. Filters that are not well aligned across sound source positions may affect timbre quality of a binaural renderer output signal and may result in sf-5621623 timbre artifacts for example, destructive and constructive interferences depending on frequency as an audio signal is panned through a VSA. These artifacts can comprise the realism of sounds in a virtual environment.

In some embodiments, aligning a sum filter and a difference filter may reduce timbre artifacts during amplitude panning. For example, samples may be added or removed at a beginning of filters to obtain better alignment between filter pairs. A relative delay between filters within filter pairs, or inter-filter delays (IFDs) may be preserved.

In some embodiments, filters may be trimmed, for example, to retain "useful" portions thereof. In some examples, useful portions may be portions that contain non-zero, non-noise magnitude and/or phase information. Trimmed filters may require less computation to process than untrimmed filters. For example, trimming filters may include removing leading zeros or low level samples (e.g., samples that fall within a noise level of the filter, for example, where the noise level of the filter may be determined by analyzing a portion of a filter that is only noise and using that information to determine a noise gate threshold) at a beginning of some or all filters in a system. In some embodiments, a same number of leading zeros or low level samples must be removed from filters in a sum-difference filter pair, for example, to preserve/maintain IFDs. In some embodiments, trimming filters may include removing trailing zeros or low level samples at an end of some or all filter in a system. As described herein, trimming filters may include removing leading zeros or low level samples and/or removing trailing zeros or low level samples. The leading zeros or low level samples and/or the trailing zeros or low level samples may be identified, for example, by setting a level threshold and removing leading samples of a signal before the signal crosses the level threshold, by identifying a peak in an impulse response and applying a predetermined window around the identified peak, by identifying a peak in an envelope of an impulse response and applying a predetermined window around the identified peak, by trimming a filter to different length and analyzing a resulting magnitude and/or phase response to determine when the trimming starts introducing undesirable artifacts, and/or by trimming a filter to a different length and evaluating an introduced distortion by listening to audio content processed through the filters.

In some embodiments, filter alignment may be achieved by generating a minimum phase version of filters. In these embodiments, pre-ringing and pre-echo in filters may be removed/eliminated, which may allow further truncation of leading zeros and short filters.

Figure 13:
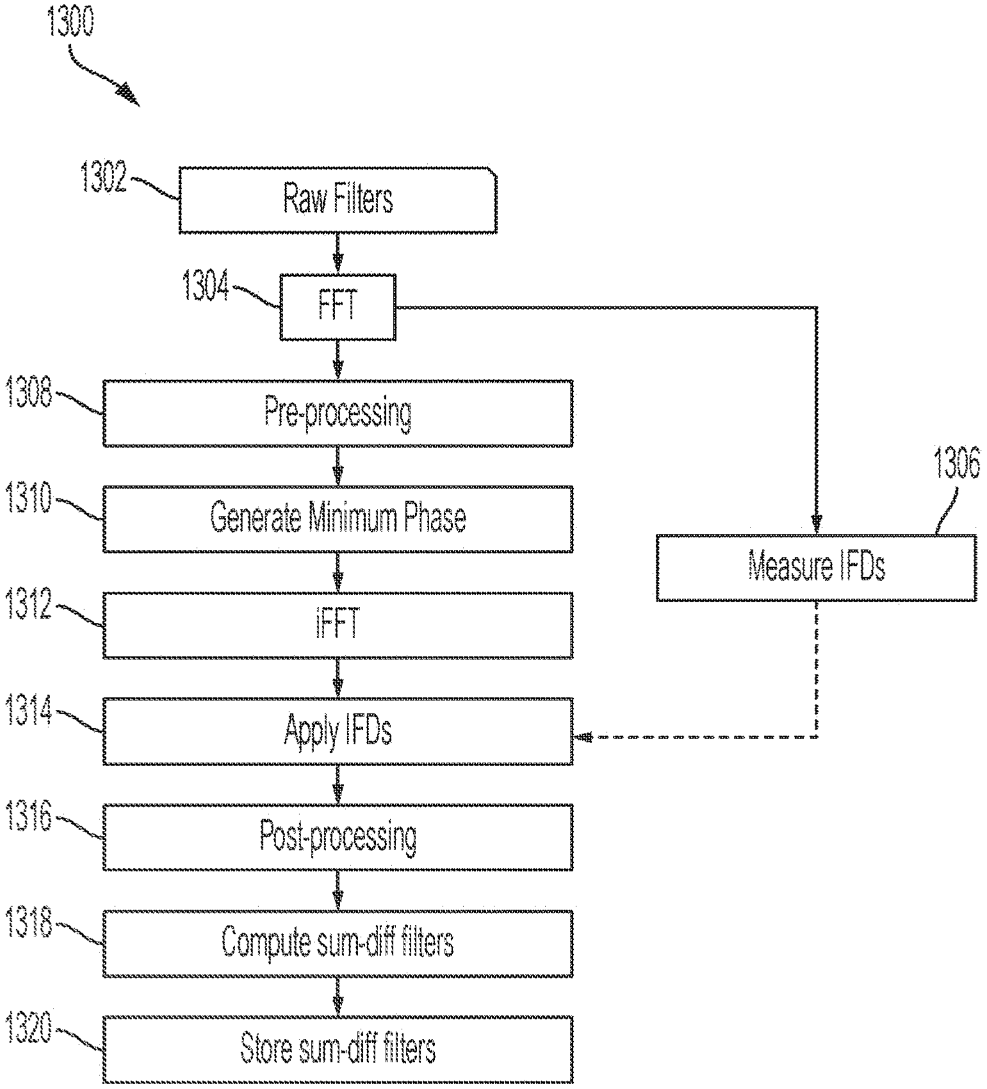
FIG. 13 illustrates a process for aligning sum and difference filters using a minimum phase approach, according to some embodiments.

FIG. 13 illustrates an example process 1300 for aligning sum and difference filters using a minimum phase approach, according to some embodiments. According to the example shown, raw filters 1302 may be converted to a frequency domain, e.g., using fast Fourier transforms (FFTs) (stage 1304). IFDs may be measured (stage 1306), for example by looking at a difference in excess phase at low frequencies between pairs of filters that are converted to the frequency domain, and may be stored for use later. At stage 1308, the filters in the frequency domain may be pre-processed. In some embodiments, pre-processing may include applying a gain, equalizing, and/or smoothing the data. A minimum-phase version of the filters may be generated from the pre-processed filters (stage 1310), and converted to a time domain using an inverse FFT (iFFT) (stage 1312). The measured IFDs may be applied to the filters in the time domain (stage 1314), e.g., in matching pairs to recreate the IFDs observed in the filters in the frequency domain. The filters with the IFD applied may be post-processed (stage 1316), which in some examples may include forcing symmetry on some of the filter pairs by setting the difference filter to zero (which may have the benefit of further reducing the computational complexity of the signal processing system). In some embodiments, truncation (e.g., time-domain windowing) may be applied to reduce length of filters. The sum and difference filters may then be computed (stage 1318) and stored for use (1320), for example, in a signal processing system.

In some embodiments, IFDs may be applied to a delayed filter only. In some embodiments, in the context of binaural rendering, applying IFDs to the delayed filter only may effectively time-align the filters for an ipsilateral ear. Since an ipsilateral ear signal may arrive in an ear first, and may be louder than a contralateral ear signal, better time alignment of ipsilateral ear filters may lead to better perceived timbre when panning audio content through a VSA using amplitude panning methods. In some embodiments, without time alignment of ipsilateral ear signals, spectral artifacts may be perceived as an audio signal is panned through the VSA, for example, due to constructive and destructive interference between misaligned signals.

In some embodiments, IFDs may be modified before applying the IFDs to filters at stage 1314. The IFDs may be modified, for example, to remove measurement errors. In some embodiments, modification of IFDs may be used to tune the IFDs to match anthropometric features of the user. In some examples, sensors can be used to tune the IFDs. For instance, sensors such as depth cameras, RGB cameras, LIDAR, sonar, orientation sensors, GPS, and so forth can be used to determine relevant acoustic parameters that can be used to modify the IFDs in accordance with those parameters. Such sensors are described above with respect to hardware for interacting with XR environments (e.g., wearable head device 100, handheld controller 200, and/or auxiliary unit 300 described above) and the use of such sensors for determining IFDs may be particularly beneficial in such applications.

In some embodiments, alignment of filters may be achieved by setting a level threshold (e.g., a threshold above a noise level of a filter) and removing samples at a beginning of a filter to a point where a signal crosses a threshold. In some embodiments, computational power of processing and memory for storing filters may be reduced by setting a second threshold (e.g., a threshold based on a level relative to a peak of an impulse response, or an immediately preceding amplitude, or a time delay subsequent to a peak impulse response) and trimming trailing zeros in the filters.

In some embodiments, alignment filters may be achieved using a cross-correlation measure to find a lag providing a highest correlation between filter responses.

In some embodiments, alignment of filters may be done empirically be measuring a transfer function of a full rendering system through a VSA and picking an alignment that provides a least amount of magnitude or phase distortion to one or both ear signals.

In some embodiments, alignment of filters may be done empirically by listening to content, for example, content that is likely to reveal artifacts, panned through a VSA and picking an alignment that provides a least amount of perceived timbral artifacts.

In some embodiments, filters such as described above with respect to FIGS. 5-13 can comprise a head-related transfer function (HRTF) filter, such as described above with respect to FIG. 400 for spatializing audio sources, e.g., in a virtual environment. For example, filters 920A, 920B, 922A, and 922B of example system 900 may comprise ipsilateral and/or contralateral HRTF filters for two sound sources in locations placed symmetrically on either side of a user (e.g., on either side of a median (mid-sagittal) plane corresponding to the user).

In such embodiments, sum and difference filters may be created by pulling/fetching/retrieving raw filters (e.g., unprocessed filters that may be derived from measurements or simulations), for example, from a discrete HRTF database and computing a sum and a difference. In some examples, such as in XR environments, the selection and creation of such filters can be informed by the outputs of sensors able to detect parameters of the user and/or the user's environment, in order to arrive at HRTF filters that may be preferred by the user in that particular environment. Such parameters can include morphological parameters of the user (e.g., the user's height, head width, and other physical dimensions), environmental parameters (e.g., the dimensions of a room in the user's environment), or other parameters relevant to selecting a HRTF filter.

As an example, a user can be equipped with a wearable head device, such as device 100 described above, to interact with a XR environment. As described above, the wearable head device can include one or more sensors to detect parameters of the user and/or the environment. Such sensors can include depth cameras, RGB cameras, LIDAR, sonar, orientation sensors, GPS, and similar sensors; these sensors can be used to determine parameters relevant to HRTF selection (e.g., environmental parameters and/or morphological parameters of the user), and HRTF filters can be selected accordingly. In some cases, such parameters (e.g., the user's height) can be input by the user and stored in a wearable system for later use.

With respect to the systems and methods described above, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described above. For example, a first computer processor (e.g., a processor of a wearable device coupled to a microphone) can be utilized to receive input microphone signals, and perform initial processing of those signals (e.g., signal conditioning and/or segmentation, such as described above). A second (and perhaps more computationally powerful) processor can then be utilized to perform more computationally intensive processing, such as determining probability values associated with speech segments of those signals. Another computer device, such as a cloud server, can host a speech recognition engine, to which input signals are ultimately provided. Other suitable configurations will be apparent and are within the scope of the disclosure.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
- receiving, at an amplitude panning stage, an audio input signal;
- processing the audio input signal to generate a first processed signal and a second processed signal, wherein the processing comprises:
  - applying a first filter to the audio input signal,
  - aligning the first filter and a second filter, and
  - applying the second filter to the audio input signal;
- adjusting, with respect to a first virtual speaker, a gain of the first processed signal to generate a first virtual speaker output;
- adjusting, with respect to a second virtual speaker, based on the gain of the first processed signal, a gain of the second processed signal to generate a second virtual speaker output;
- determining, based on a sum of the first virtual speaker output and the second virtual speaker output, a virtual speaker array output associated with a virtual speaker array comprising the first virtual speaker and the second virtual speaker; and
- presenting the virtual speaker array output to one or more of a first speaker and a second speaker, wherein the first speaker and the second speaker are associated with a wearable head device.

2. The method of claim 1, wherein said aligning the first filter and the second filter comprises determining an inter-filter delay (IFD) and applying the IFD to one of the first filter and the second filter.

3. The method of claim 2, further comprising modifying the IFD based on an anthropometric feature of a user of the wearable head device.

4. The method of claim 2, further comprising adjusting the IFD based on an output of a sensor of the wearable head device.

5. The method of claim 1, wherein said aligning the first filter and the second filter comprises:
- determining a transfer function associated with the virtual speaker array; and
- selecting an alignment based on the transfer function to minimize an amount of distortion.

6. The method of claim 5, wherein said determining a transfer function associated with the virtual speaker array comprises empirically measuring the transfer function.

7. The method of claim 1, wherein said aligning the first filter and the second filter comprises:
- applying an audio signal to the virtual speaker array;
- detecting a timbral artifact associated with the application of the audio signal to the virtual speaker array; and
- selecting an alignment to reduce the timbral artifact.

8. A system comprising:
- a wearable head device including a first speaker and a second speaker; and
- one or more processors configured to perform a method comprising:
  - receiving, at an amplitude panning stage, an audio input signal;
  - processing the audio input signal to generate a first processed signal and a second processed signal, wherein the processing comprises:

applying a first filter to the audio input signal,
aligning the first filter and a second filter, and
applying the second filter to the audio input signal;

adjusting, with respect to a first virtual speaker, a gain of the first processed signal to generate a first virtual speaker output;

adjusting, with respect to a second virtual speaker, based on the gain of the first processed signal, a gain of the second processed signal to generate a second virtual speaker output;

determining, based on a sum of the first virtual speaker output and the second virtual speaker output, a virtual speaker array output associated with a virtual speaker array comprising the first virtual speaker and the second virtual speaker; and presenting the virtual speaker array output to one or more of the first speaker and the second speaker.

9. The system of claim 8, wherein said aligning the first filter and the second filter comprises determining an IFD and applying the IFD to one of the first filter and the second filter.

10. The system of claim 9, wherein the method further comprises modifying the IFD based on an anthropometric feature of a user of the wearable head device.

11. The system of claim 9, wherein:

the wearable head device comprises one or more sensors; and the method further comprises adjusting the IFD based on an output of the one or more sensors.

12. The system of claim 8, wherein said aligning the first filter and the second filter comprises:

determining a transfer function associated with the virtual speaker array; and selecting an alignment based on the transfer function to minimize an amount of distortion.

13. The system of claim 12, wherein said determining a transfer function associated with the virtual speaker array comprises empirically measuring the transfer function.

14. The system of claim 8, wherein said aligning the first filter and the second filter comprises:

applying an audio signal to the virtual speaker array;

detecting a timbral artifact associated with the application of the audio signal to the virtual speaker array; and selecting an alignment to reduce the timbral artifact.

15. A non-transitory computer-readable medium storing instructions which, when executed by one or more processors, cause the one or more processors to perform a method comprising:

receiving, at an amplitude panning stage, an audio input signal;

processing the audio input signal to generate a first processed signal and a second processed signal, wherein the processing comprises:
applying a first filter to the audio input signal,
aligning the first filter and a second filter, and
applying the second filter to the audio input signal;

adjusting, with respect to a first virtual speaker, a gain of the first processed signal to generate a first virtual speaker output;

adjusting, with respect to a second virtual speaker, based on the gain of the first processed signal, a gain of the second processed signal to generate a second virtual speaker output;

determining, based on a sum of the first virtual speaker output and the second virtual speaker output, a virtual speaker array output associated with a virtual speaker array comprising the first virtual speaker and the second virtual speaker; and presenting the virtual speaker array output to one or more of a first speaker and a second speaker, wherein the first speaker and the second speaker are associated with a wearable head device.

16. The non-transitory computer-readable medium of claim 15, wherein said aligning the first filter and the second filter comprises determining an IFD and applying the IFD to one of the first filter and the second filter.

17. The non-transitory computer-readable medium of claim 16, wherein the method further comprises modifying the IFD based on an anthropometric feature of a user of the wearable head device.

18. The non-transitory computer-readable medium of claim 16, wherein the method further comprises adjusting the IFD based on an output of a sensor of the wearable head device.

19. The non-transitory computer-readable medium of claim 15, wherein said aligning the first filter and the second filter comprises:

determining a transfer function associated with the virtual speaker array; and selecting an alignment based on the transfer function to minimize an amount of distortion.

20. The non-transitory computer-readable medium of claim 15, wherein said aligning the first filter and the second filter comprises:

applying an audio signal to the virtual speaker array;

detecting a timbral artifact associated with the application of the audio signal to the virtual speaker array; and selecting an alignment to reduce the timbral artifact.

* * * * *